Aug. 28, 1962 J. WALTON 3,051,494
GRAMOPHONE PICKUPS
Filed Nov. 16, 1959 2 Sheets-Sheet 1
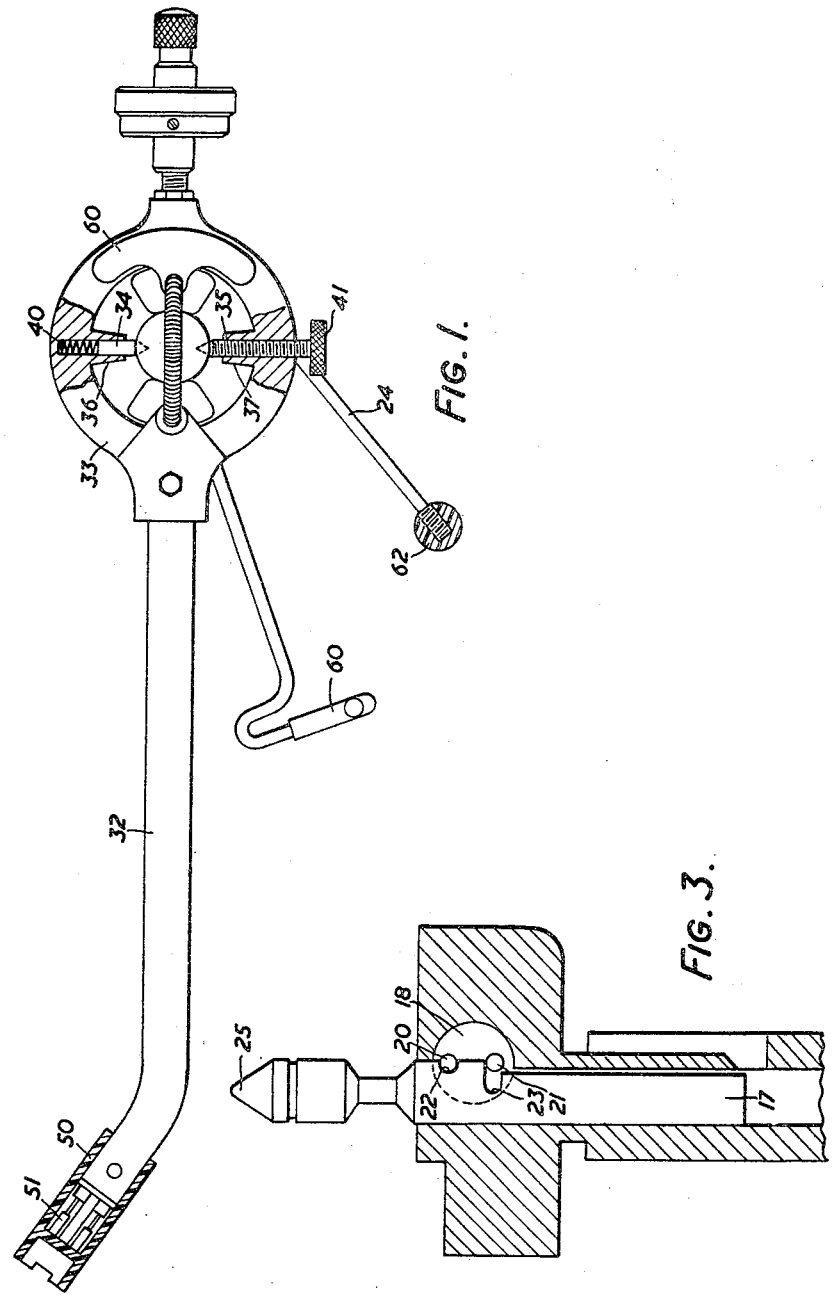
INVENTOR
Jean Walton
BY
Pierce, Scheffler & Parker
ATTORNEY

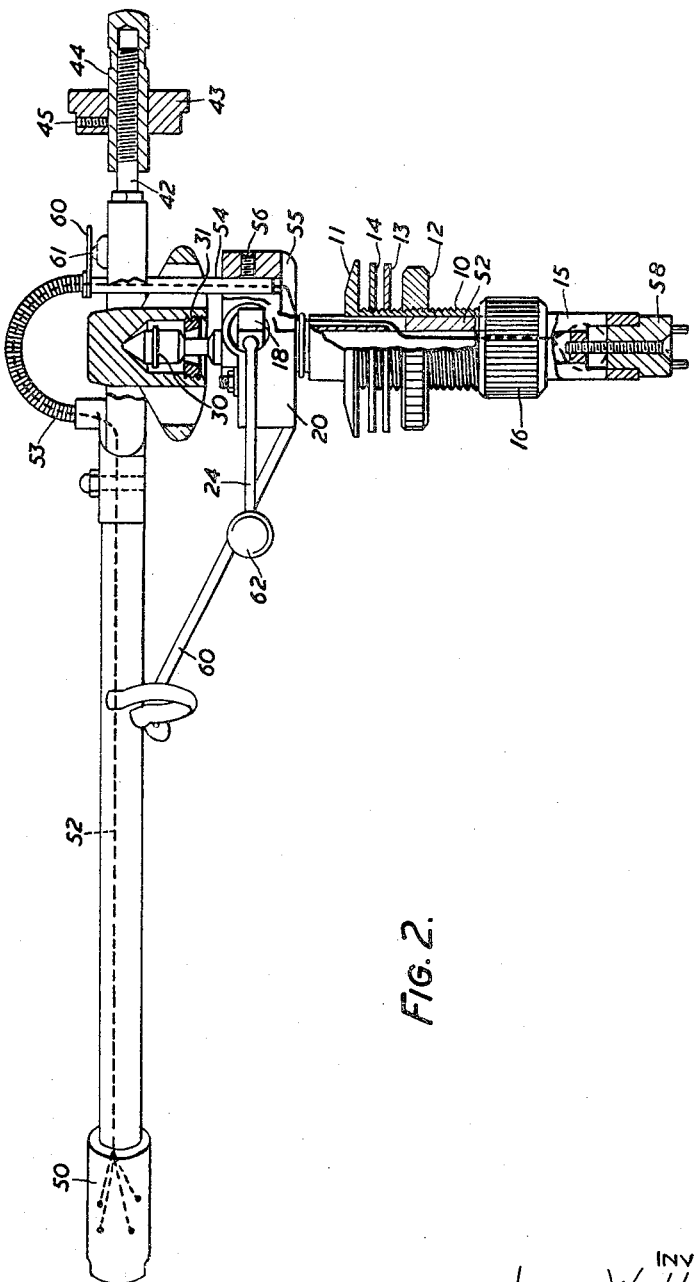

United States Patent Office 3,051,494
Patented Aug. 28, 1962

3,051,494
GRAMOPHONE PICKUPS
Jean Walton, London, England, assignor to Cosmocord Limited, Waltham Cross, England
Filed Nov. 16, 1959, Ser. No. 853,269
Claims priority, application Great Britain Nov. 20, 1958
16 Claims. (Cl. 274—23)

This invention relates to gramophone pick-ups and, in particular, to support arms for carrying such pick-ups.

At the present time, there is a tendency to use pick-ups which present a very small downward force at the point of contact of the stylus with the record. At present, contact pressures of the order of three grams are encountered frequently, and much lower pressures, of one gram or less, are contemplated or in occasional use.

Pick-ups having such a low stylus contact pressure impose a particular difficulty in the design of suitable arms for supporting them.

The present invention is concerned with a construction of a support arm which has certain features of advantage when used to support a pick-up with only a very light vertical pressure, and the invention consists broadly of a gramophone pick-up arm assembly comprising a support, a member having appreciable weight pivotally mounted on the support by means of a single pivot point, and an arm mounted on the weight member for pivotal movement about a horizontal axis.

The invention also includes a gramophone pick-up arm assembly comprising a support, a member having appreciable weight mounted on the support on a single pivot bearing permitting movement of the member about at least a vertical axis, and an arm mounted on the weight member for pivotal movement about a horizontal axis, the pivoting parts of the support and the weight member being held in engagement by gravity, and the centre of gravity of the moving parts being below the said engaging pivoting parts.

Other features and advantages of the invention will appear from the following description of one embodiment thereof, given by way of example, in conjunction with the accompanying drawings, in which:

FIGURE 1 is a plan view of a gramophone pick-up arm,

FIGURE 2 is a side elevational view, partly in section, of the device of FIGURE 1, and FIGURE 3 is a fragmentary sectional view showing part of the arm raising and lowering mechanism.

In this form of the invention, the support arm is mounted for pivotal movement by pivots which have different effective axes of rotation, so that in use the necessary vertical movement of the support arm is divorced from its horizontal movement. Thereby it can be arranged that the moment of inertia for movements about a horizontal axis, corresponding to vertical movements of the stylus, is less than that about the vertical axis. Further, one of the pivots is of the point type, so that the connection between the arm and the support has a degree of freedom of movement about three axes, at right angles; these axes are coincident.

When using an extremely light-weight pick-up, a further difficulty that arises is that of placing the stylus in contact with the record, and likewise of removing it from the record when the latter has been played. The construction of the invention to be described includes means by which the pick-up can be lowered very gently on to the record, thus avoiding damage both to the pick-up and the record.

It may be desirable with a pick-up intended for high quality reproduction, to provide means for adjusting the playing weight of the pick-up. With very low playing weights, this requires a very sensitive detector of the force imposed on the record by the stylus. In accordance with a feature of the construction to be described, means are provided on a pick-up for adjusting a counterweight so that the pick-up is in balance, that is to say, where the stylus would not impose any pressure on the record, and then by adding to the system a predetermined weight so as to produce the desired pressure at the stylus tip.

The embodiment of the invention shown in the drawings is a support arm assembly intended for a pick-up of which the playing weight, considered at the stylus tip, is of the order of one-half to one gram. The support arm assembly consists essentially of three relatively movable parts: a support post, intended to be secured to a motorboard or the like, a second member which is supported with respect to the post member and has a degree of freedom with respect to it about a first axis, and a further member which is supported from the second, and has with respect to it a degree of freedom about a further axis, at a substantial angle to the first. In this embodiment, the first axis is vertical and the second horizontal.

The post member itself has two relatively moving parts, with the object of providing the lowering mechanism, for lowering the pick-up on to the record.

Turning to the construction in more detail, the post member comprises a bush 10, having an external thread by which it may be passed through a motorboard and secured between a flanged part 11 on the bush and a suitable nut 12 run on to the threaded portion; washers 13, 14 are provided.

Within the bush is a sleeve 15; this sleeve can be adjusted longitudinally within the bush, but this adjustment is made only on installation, and thereafter the bush and sleeve remain secured together. This adjustment enables the height of the support arm above the motorboard to be varied, without affecting any of the other adjustments. To secure the sleeve in its adjusted position, the lower end of the threaded part of the bush is split coned and a coned nut 16 is used to clamp the bush to the sleeve.

Within the sleeve is the post proper 17. The post can slide longitudinally within the sleeve, but is held against rotation; to enable the post to be raised and lowered, an actuator is provided, which includes two short coaxial cylindrical members of which one is shown at 18 in FIGURE 3, joined by two rods 20, 21 disposed on a diameter of the cylinders. As shown in FIGURE 3, post 17 has two transverse slots 22, 23, of different depth. The actuator can be turned by means of a small hand lever 24 provided with a ball member 62 at the outer free end thereof. When the cylinder 18 is turned in a clockwise direction as seen in FIGURE 3 rod 21 will engage slot 23 and lift the post; movement is limited by rod 20 when this engages a flat 19 on the post. When the cylinder is turned in the opposite direction, the post will lower until rod 20 fully enters slot 22, in the position shown in FIGURE 3.

At its upper end the post has a conical point 26 with a spherical tip constituting a single pivot point bearing, upon which is balanced the second member of the assembly, referred to above. This second member is a balance-weight 28 which rests on the top of the projecting part of the post and has a conical recess terminating in a spherical bearing to receive the pivot point 26 which is of smaller radius. The weight of the member 28 and its shape are such that the centre of gravity of the system which pivots on the post is below the pivot point, so that the system is balanced in stable equilibrium. The weight is held captive on the post by a spring washer 30 on the post and a screwed retaining ring 31 in the recess on the underside of the weight. The conical pivot is slightly more acute than the conical recess and renders the pivot action of the arm as a whole unaffected by small deviations of the post from the vertical.

The third part of the system includes the arm, which is pivoted on the second member. The arm includes a tubular part 32, which is fixed to a mounting ring 33 which surrounds the second member and is pivoted to it, for movement about a horizontal axis by means of two pivot pins 34, 35 which engage corresponding pivot recesses on the second member. Conveniently, the pivot pins are housed in inwardly extending projectings 36, 37 on the ring member. Pin 34 is spring biased by a spring 40; pin 35 can be adjusted by means of a milled knob 41. In this way the vertical pivotal movement can be easily adjusted to be free, but without play, and this also gives side balance adjustment. The horizontal pivot axis for arm 32 through the pivot pins 34, 35 intersects the vertical axis through the pivot point 26 and the pivot point 26 lies on that horizontal axis.

On that part of the ring opposite the point to which the arm 32 is secured is a counterweight support 42, consisting of a rod 42 on which is disposed a suitable weight 43, which can be adjustable for the purpose of counterbalancing the system in the horizontal plane. The counterweight 43 can be roughly set in position on a sleeve 44, and locked by a grub screw 45; the sleeve 44 is screw threaded on support rod 42 for fine adjustment.

The pick-up head mounting consists of a moulding 50 which can be secured to the end of the arm 32, the end of the arm being cranked so that the head is at an offset-angle to give the minimum tracking error in known manner. The pick-up cartridge proper plugs into the end of the moulding 50, and connection is made to it by a series of socket members 51 which engage pins on the end of the cartridge, not shown. In a pick-up of the type described, where lightness of the parts is important, it is difficult to secure a satisfactory contact to the small pins used. In accordance with one feature of the present invention, the desired frictional engagement between the pins and the sockets 51 is ensured by arranging that the pitch of the sockets differs slightly from the pitch of the pins; it is convenient to arrange that the sockets are received in a body of insulating material, in which case the holes of this body can be formed at the appropriate pitch centres. Thereby adequate contact will be ensured when the pins and sockets are mated. If the body of insulating material is slightly flexible, a very satisfactory action is ensured.

It is necessary to ensure that the connections made from the pick-up cartridge to the stationary part of the arm shall not interfere with the balance. With a conventional arm, at normal tracking weights, this provision is possible without difficulty, but with the very small playing pressures involved with the present construction the problem is much more difficult of solution. In the embodiment described, an arrangement is adopted which gives a small, but consistent force between the moving parts, which, being consistent, can be balanced out with the counterweight.

The leads from sockets 51 follow a path 52 indicated in FIGURE 2 and then pass through a conduit 53 formed by a spirally wound spring wire. The forward end of conduit 53 is fastened to ring 33; its rearward end is fastened to a tube 54 held in an enlargement 55 at the upper end of the sleeve 15. Tube 54 is held to the sleeve by grub screw 56. The connecting leads pass from the end of tube 54 into a recess 57 in sleeve 15, thence to the interior of the sleeve and to a contact plug 58 secured in the bottom of the sleeve.

Tube 54 also carries a small arcuate plate 60 which, in conjunction with a projection 61 formed on the rear part of ring 33, causes the pick-up head to be lifted clear of the record when the arm 24 is raised. It will be seen that when the projection strikes the underside of the plate, the pick-up head will be raised. The plate has a sufficient angular extent about pivot 25 to enable this to be done at any normal position of the pick-up.

The plate 60 can be coated with frictional material, so that before the pick-up is lowered the arm can be moved to any desired position above a desired part of the record, and when the arm is lowered it will engage that part. The movement in doing so is gentle, and the pick-up will engage the record with the desired pressure.

Moreover, if the co-operating parts, especially post 17 and sleeve 15, are coated with a viscous material, such as silicone grease, the movement will be further slowed. With the lowering mechanism as described, as the stylus approaches the record a given angular movement of the lowering lever causes only a small vertical movement of the arm and stylus again assisting towards very gradual engagement with the record. The weight of the arm on the centre pivot in conjunction with the viscous grease, makes the arm virtually self-lowering once movement is initiated.

A rest arm 64 for the pick-up can be secured from the upper part 55 of sleeve 15.

With a pick-up of the kind described, with a very light playing pressure it is not easy to ensure that the correct pressure is obtained, without the use of an accurate measuring device. In accordance with another feature of the present invention, the desired playing pressure is obtained by first balancing the arm as a whole, by means of the adjustable counterweight 45, until the arm is exactly balanced; this is an adjustment which can be made visually without any additional apparatus. The desired playing pressure can then be obtained merely by placing on the pick-up, at the appropriate point, a member of predetermined weight. The weight may, or may not, be permanently attached to the support arm, the desired change in needle pressure being obtained by moving the weight from one position to another, or it may be completely detachable from the arm. The weight may be an otherwise useful part of the construction such as a screw, clip, or the like.

I claim:

1. A gramophone pick-up arm assembly comprising a substantially vertical support, a member having appreciable weight pivotally mounted on said support by means of a single pivot point bearing, a pick-up supporting arm, horizontal pivot means pivotally mounting said arm on said weighted member for pivotal movement about a horizontal axis, said arm being substantially balanced about said horizontal pivot axis and the center of gravity of said weighted member and said arm together being below said pivot point bearing so that said weighted member depends by gravity from said pivot point bearing.

2. A gramophone pick-up arm in accordance with claim 1 wherein said horizontal pivot axis of said arm intersects with the vertical axis through said pivot point bearing of said weighted member.

3. A gramophone pick-up arm in accordance with claim 1 wherein said pivot point bearing of said weighted member lies on said horizontal pivot axis of said arm.

4. A gramophone pick-up arm in accordance with claim 1 and which further includes means for adjusting the height of said single pivot point bearing.

5. A gramophone pick-up arm in accordance with claim 4 and wherein said means for adjusting the height of said single pivot point bearing includes a control member for readily effecting such adjustment.

6. A gramophone pick-up arm in accordance with claim 1 wherein electric connections between said arm and said support are effected through means establishing a substantially constant force between those parts.

7. A gramophone pick-up arm in accordance with claim 6, wherein the said means include a flexible tube.

8. A gramophone pick-up arm in accordance with claim 7, wherein said tube is formed by a spirally wound member.

9. A gramophone pick-up arm in accordance with claim 1, and comprising an adjustable counterweight, for adjusting the balancing of said arm about its horizontal axis.

10. A gramophone pick-up arm in accordance with claim 9, and including a pick-up head attached to said arm, a pressure adjusting member movable, with respect to the arm, from a first to a second position to increase the pressure at the stylus tip of the head by a predetermined amount, said counterweight permitting balancing of the arm in the said first position.

11. A gramophone pick-up arm in accordance with claim 10, wherein the pressure adjusting member is permanently attached to said arm.

12. A gramophone pick-up arm in accordance with claim 1 wherein said single pivot point bearing is located at the upper end of a vertical post which constitutes the support therefor, said post being slidably adjustable within a stationary sleeve member adapted to be attached to a main support, and a control member for effecting vertical adjustment of said post in said sleeve.

13. A gramophone pick-up arm in accordance with claim 12 wherein said control member is arranged to adjust said post more slowly, for a given movement thereof as said post approaches the position at which a pick-up on said arm, in use, engages the surface of a record.

14. A gramophone pick-up arm in accordance with claim 13, wherein said control member rotates a part having an eccentric portion engaging a slot or the like in said post.

15. A gramophone pick-up arm in accordance with claim 12, and comprising a stop against which said arm abuts when said post is lifted, thereby to cause said arm to pivot in a direction to lift the pick-up head end of the arm.

16. A gramophone pick-up arm in accordance with claim 15, wherein said stop is effective over a range of angular positions of said arm, about the vertical axis, whereby the pick-up head can be lowered at a desired position onto a record.

References Cited in the file of this patent

UNITED STATES PATENTS

| 2,776,144 | Nicholes | Jan. 1, 1957 |
| 2,993,698 | Stanton | July 25, 1961 |

FOREIGN PATENTS

| 618,814 | Great Britain | Feb. 28, 1949 |
| 1,105,702 | France | Dec. 7, 1955 |